(12) United States Patent
Cheng et al.

(10) Patent No.: US 7,979,298 B2
(45) Date of Patent: Jul. 12, 2011

(54) METHOD AND APPARATUS FOR OPERATIONAL RISK ASSESSMENT AND MITIGATION

(75) Inventors: Feng Cheng, Chappaqua, NY (US);
David Gamarnik, New York, NY (US);
Wanli Min, Cortlandt Manor, NY (US);
Bala Ramachandran, Harrison, NY (US); Jonathan Miles Collin Rosenoer, Marin County, CA (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/062,802

(22) Filed: Apr. 4, 2008

(65) Prior Publication Data
US 2008/0215401 A1    Sep. 4, 2008

Related U.S. Application Data

(63) Continuation of application No. 10/983,641, filed on Nov. 9, 2004, now abandoned.

(51) Int. Cl.
*G06Q 10/00* (2006.01)
(52) U.S. Cl. ................................................ 705/7.28
(58) Field of Classification Search ............. 705/7, 7.28
See application file for complete search history.

(56) References Cited

U.S. PATENT DOCUMENTS

| | | | | |
|---|---|---|---|---|
| 5,930,762 | A  * | 7/1999 | Masch | 705/7 |
| 2002/0188496 | A1* | 12/2002 | Feldman et al. | 705/10 |
| 2004/0015376 | A1* | 1/2004 | Zhu et al. | 705/7 |
| 2006/0085323 | A1* | 4/2006 | Matty et al. | 705/38 |

OTHER PUBLICATIONS

P.Danum, et al. Approximating Probabilistic Inference in Bayesian Belief Networks IS HP-Hard, Artificial Intelligence 60 (1993) 141-153 Elsevier.
D. Chickering et al., Learning Bayesian Networks is NP-Hard, Microsoft Research Advanced Technology Division Microsoft Corporation, Technical Report, MSR-TR-94-17, Nov. 1994.
AGENARisk 3.0 User Manual; Version 1.0, Jul. 1, 2004 pp. 1-98.
Basel Committee on Banking Supervision, Consultative Document, The New Basel Capital Record, Issued for momment by Jul. 31, 2003, Apr. 2003, pp. 1-216.
SAS International, SAS OpRisk Managment, A Methodology and Architecture for Identifying, Measuring, Monitoring, Controlling and Reporting Operational Risks Throughout Your Organization, www.sas.com.

* cited by examiner

*Primary Examiner* — Romain Jeanty
*Assistant Examiner* — George H Walker
(74) *Attorney, Agent, or Firm* — Whitham, Curtis, Christofferson & Cook, P.C.; Stephen C. Kaufman

(57) ABSTRACT

Risk in business management is analyzed based on a probabilistic network approach which quantifies the impact of operational risk on financial metrics such as Value-at-Risk (VAR) and/or Potential Losses (PL). This approach provides further capability to determine the optimal placement of one or more countermeasures within a system to minimize the impact of operational risks.

12 Claims, 6 Drawing Sheets

METHOD AND APPARATUS FOR OPERATIONAL RISK ASSESSMENT AND MITIGATION

CROSS-REFERENCE TO RELATED APPLICATIONS

This application is a continuation of U.S. patent application Ser. No. 10/983,641, filed Nov. 9, 2004, now abandoned, and which is incorporated herein by reference.

BACKGROUND OF THE INVENTION

1. Field of the Invention

The present invention generally relates to modeling operational risk for business management and, particularly, to an approach of assessing the impact of economic impact of risk and optimizing risk control countermeasures.

2. Background Description

Organizations are increasingly interested in robust systems for assessing and managing operational risk. The growing interest in operational risk management has been driven by a variety of factors, including the introduction of new regulations requiring businesses to quantify and manage operational risk, such as the New Basel Capital Accord, known as Basel II (see "The New Basel Capital Accord", Bank for International Settlements, April 2003).

A prevailing definition of operational risk is given by the Basel Committee on Banking Supervision as "the risk of loss resulting from inadequate or failed internal processes, people or systems or from external events". (See, "Working Paper on the Treatment of Operational Risk", Basel Committee on Banking Supervision, September 2001.)

Prior art in operational risk modeling has been based on (a) statistical modeling of rare events and extreme value theory (see for example, see "Advances in Operational Risk", Risk Books, 2003), and (b) Bayesian networks (see, for example, *Operational Risk-Measurement and Modeling*, Jack King, Wiley Publishers, 2001). Commercial software is also available based on these techniques (see for example, SAS OpRisk Management, published by SAS International, Heidelberg, Germany, and AgenaRisk 3.0, published by Agena Limited, London, United Kingdom). The drawback with the statistical approach is that very limited data is available on operational risk events. The drawback with the Bayesian network approach in the literature is that: (i) Inferencing problem in Bayesian networks is in general a computationally hard problem, i.e. NP-hard problem, which means that the computational effort grows exponentially as a function of input parameters such as risk events etc. (See D. M. Chickering, D. Geiger, D. Heckerman, "Learning Bayesian Networks is NP-hard", Technical Report MSR-TR-94-17, Microsoft Research, 1994 & P. Dagum, M. Luby, "Approximating Probabilistic Inference in Bayesian Belief Networks is NP-hard", Artificial Intelligence, 60 (1), pg 141-153, 1993). The implication of this is that this is not an efficient approach for operational risk modeling. By "efficient", we mean that the computational effort is a polynomial function of input parameters for the model such as risk events, network topology etc. See Garey & Johnson, "Computers & Intractability: A Guide to the Theory of NP-Completeness" for a detailed description of NP-hard problems, polynomial algorithms etc. (ii) There is no systematic method known to construct these networks linked to business processes (e.g., of a financial institution). Moreover, these also suffer from the limitation in data on operational risk events, which will hamper the calibration and updating of these models.

The background described above indicates the need to develop a systematic methodology for operational risk assessment, based on the operational business processes in an enterprise and knowledge of its underlying physical and logical infrastructure, thus leading to a functional operational risk assessment and management system. Such a methodology can further be used as a basis to evaluate different countermeasures for operational risk control and mitigation. A general methodology for risk control consists of three steps: identification of risks, quantitative analysis of identified risks and the construction of a plan to control the risks, given a risk tolerance level. The first step involves estimating event's probability (frequency) and the event's potential size of loss (impact), which requires monitoring of operational risk events. The second step includes analyzing the correlations between various identified risk events and modeling them by a sound quantitative approach that will reveal the distribution of loss. It is at this step that different models enter. In the third step, the dominant risk events are identified and the cost-effectiveness of various risk countermeasures are calculated, on the basis of which an optimized risk control strategy is determined.

SUMMARY OF THE INVENTION

This invention provides a process or methodology for assessing the operational risk of an entity, such as a bank or financial institution. According to one aspect of the invention, the method comprises the steps of:

modeling the business process in an enterprise, along with the supporting logical and physical infrastructure and one or more operational risks contained therein. The risks need not be limited to the ones defined in Basel II.

construction of a probabilistic model, based on the business process, supporting infrastructure and risks contained therein.

assessing in an efficient manner the business impact due to the operational risk event.

The present invention differs from the prior art in the following respects:

We develop a systematic method to construct a probabilistic network based on the business processes in an enterprise, its underlying physical and logical infrastructure and a taxonomy of operational risks.

We use efficient techniques to analyze the overall potential exposure to losses in the current environment or from the proposed countermeasures.

We evaluate the effectiveness of countermeasures and mitigants that can be employed to prevent loss realization.

We identify the most important causes of operational risk in the enterprise.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED
EMBODIMENT OF THE INVENTION

Figure 1:
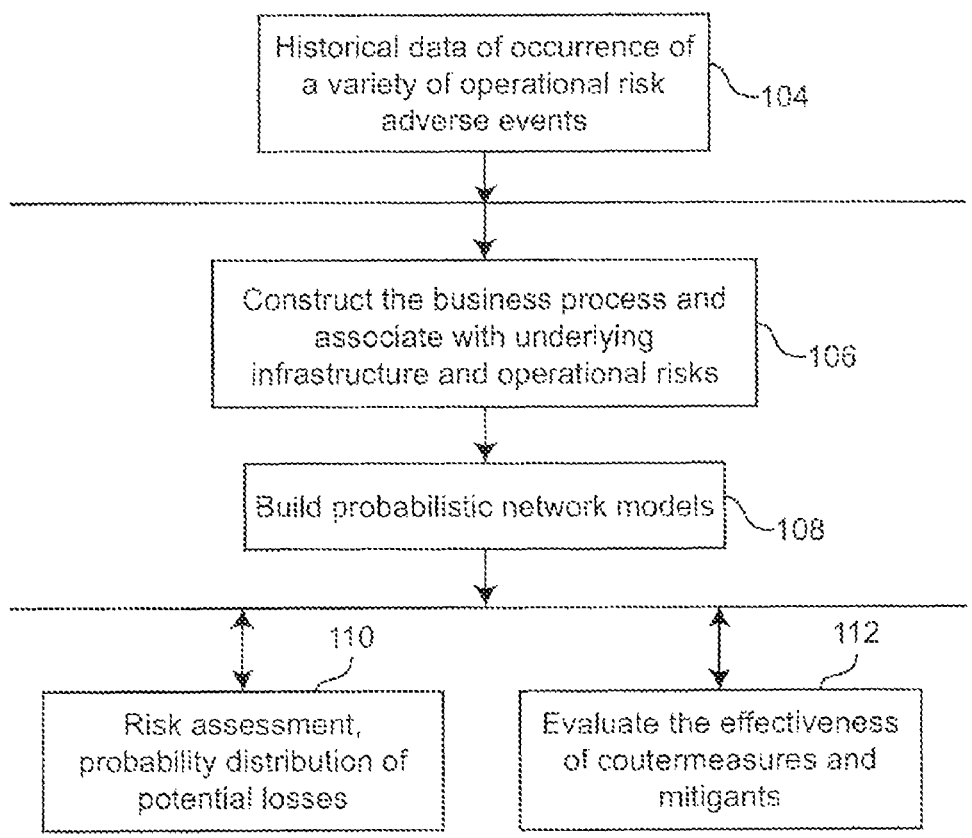
FIG. 1 is a block diagram showing the overall methodology employed in the invention.

Referring now to the drawings, and more particularly to FIG. 1, there is shown a preferred embodiment of the method and data structures according to the present invention. Function block 104 involves identifying adverse events and collecting historical record on the occurrence of various adverse events that may contribute or result in operational risk. Function block 106 involves the identification of the business process, and association with its underlying physical and logical infrastructure and operational risks contained therein. Function block 108 involves the construction of a probabilistic network model based on the business process, the underlying infrastructure and operational risk events. Function block 110 provides the distribution of overall potential losses, which are computed based on convolution of the distributions of potential losses due to respective adverse events. Function block 112 evaluates the effectiveness of a variety of countermeasures. In the case where countermeasures may change the distribution of specific adverse events, the process repeats function blocks 108 and 110 with the proposed countermeasures. The new distribution of potential losses post-countermeasures is compared with that of "as-is" process at the pre-specified risk tolerance level. The effectiveness is then determined by further considering the cost of performing the countermeasures.

Figure 2:
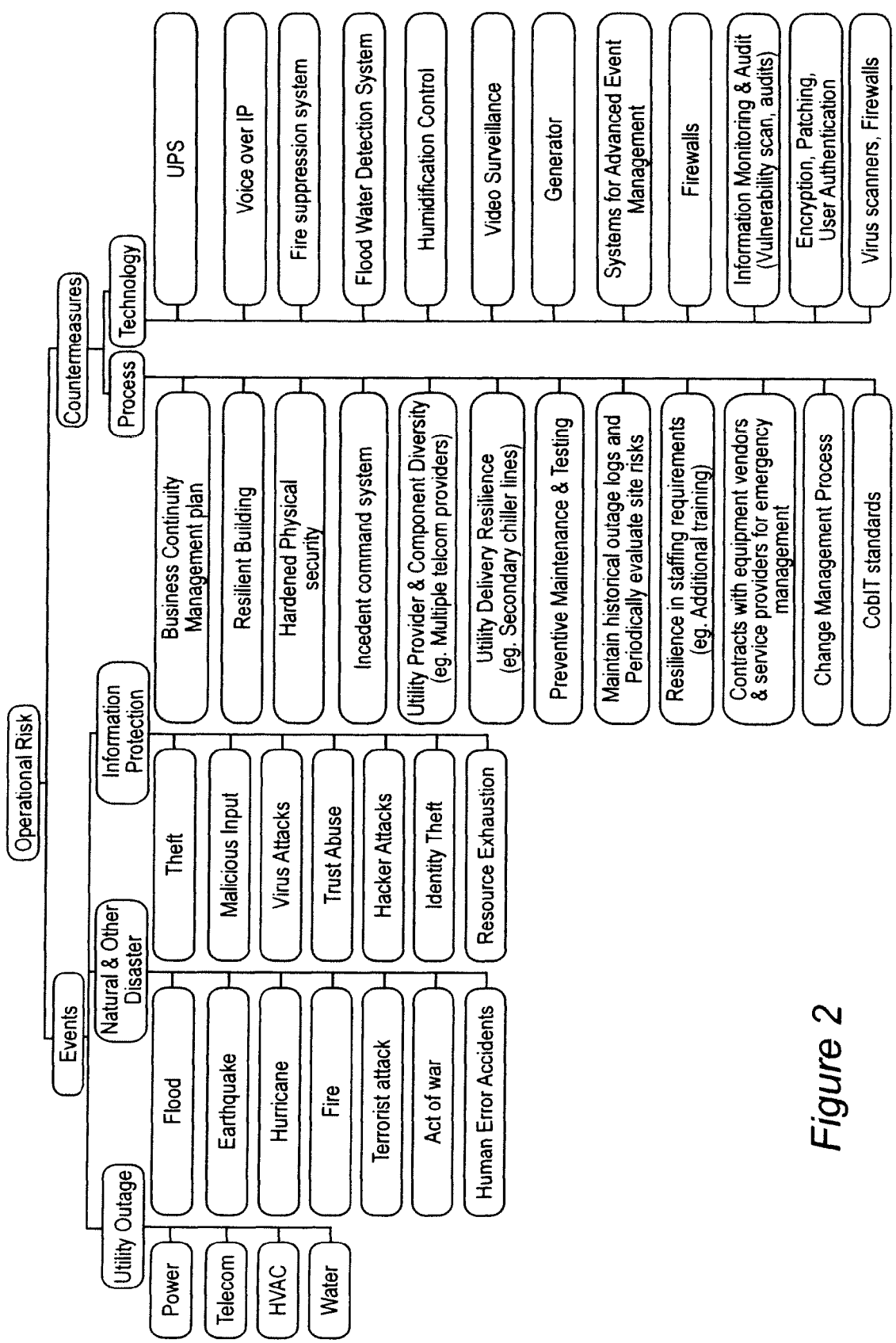
FIG. 2 is a diagram illustrating a taxonomy of operational risk events and countermeasures.

The actions involved in function blocks 104-112 are now described in detail. First a list of potential adverse events that can affect the operational risk of the underlying enterprise is collected. This list constitutes what is called the taxonomy of adverse events with respect to the given enterprise. An illustrative taxonomy of operational risk events and countermeasures is given in FIG. 2. The frequency and the duration are associated with each type of adverse event. This taxonomy is only for illustrative purposes and this invention is not limited by any specific details of operational risk taxonomies.

The frequency is a probability distribution describing the likelihood of the number of occurrence of this particular event, over a specified time period. For example if the adverse event is "data center is down" the corresponding frequency can be given as "data center is down once a year with probability 30%, twice with probability 15% and never with probability 55%". The frequency distribution can be constructed using historical data, expert knowledge or using any other means suitable for the purpose. The present invention is not limited to the nature of how exactly such a frequency function is constructed.

The duration of the adverse event is a probability distribution describing the likelihood of duration of a particular adverse event. For example for the event "data center is down" it can be given as "the data center is down for 12 hours with probability 60% and 24 hours with probability 40%". The duration distribution can be constructed using historical data, expert knowledge or using any other means suitable for the purpose. The present invention is not limited to the nature of how exactly the duration probability function is constructed.

Figure 3:
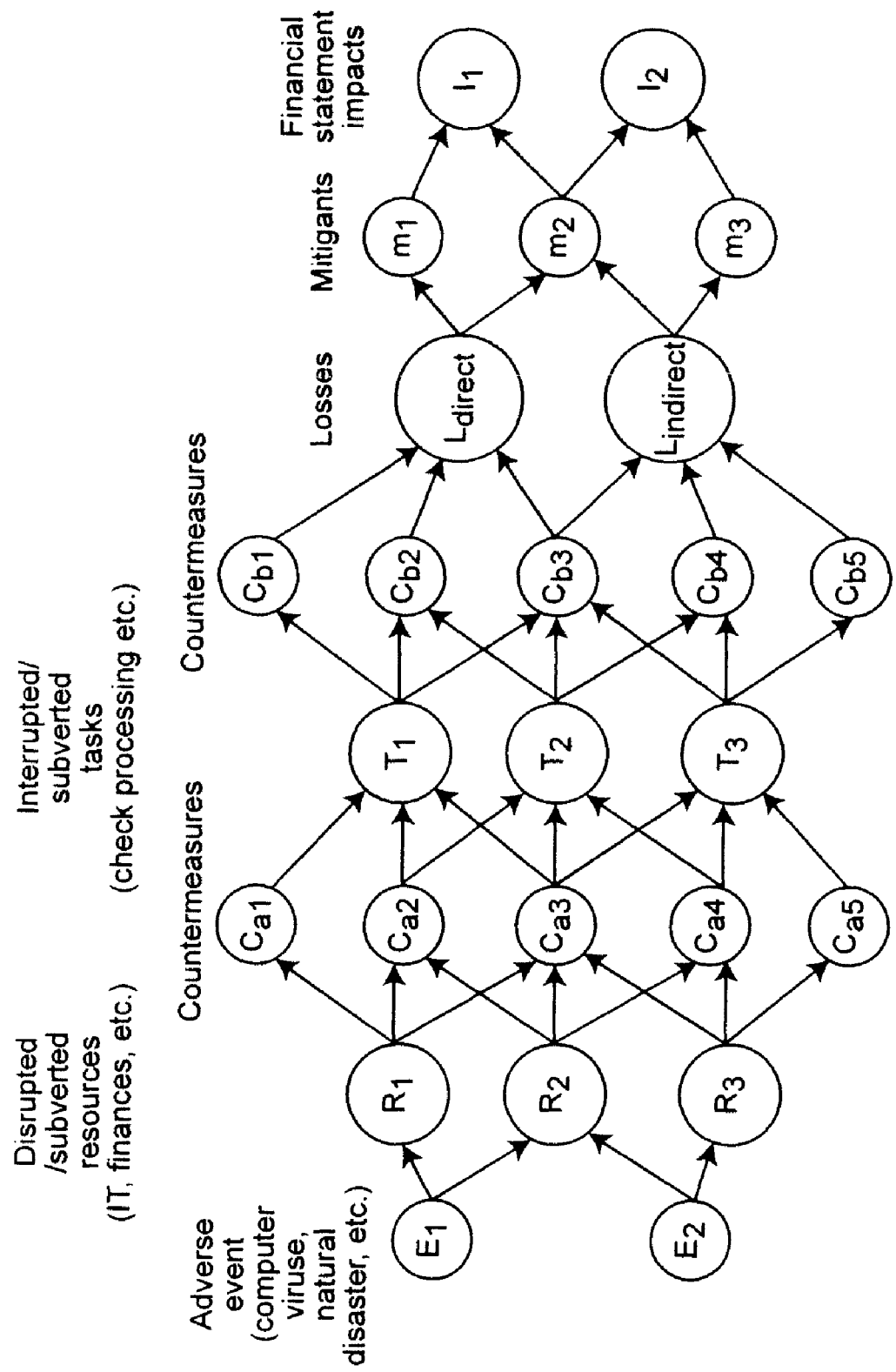
FIG. 3 is a schematic diagram showing a three-tier architecture underlying the stochastic network modeling of an operational risk of an enterprise.

The taxonomy of different adverse events is linked to the collection of the resources underlying the enterprise that are further linked to the collection of activities (tasks) ongoing in the enterprise. This is described further in FIG. 3. The linking is described via a graph with links between events, resources and activities. For example a link between the adversary event "flood" can be linked to the resources "web server cluster" and "mainframe" meaning that when the flood occurs both of the resources are incapacitated. The resource "web server cluster" can be associated for example with processes and/or activities such as "Online Banking" and "Broker Dealer Services", meaning if the resource "web server cluster" is down these processes and/or activities cannot function. Furthermore there can be precedence constraints between the activities described via a directed graph. For example, a directed link between task "database query" and "online purchase completion" means that the second task cannot take place before the first one does. The collection of adverse events, resources, activities and links between them constitute the three-tier topology of the operational risk structure underlying the given enterprise. All losses need not follow the event-resource-activity structure. For example, a hacker can enter and modify data in an enterprise application, transferring $1 million to his account. This operational risk does not involve any process activity. These can however be modeled by introducing pseudo-entities (for example, pseudo resources) as appropriate.

The activities (tasks) of the enterprise can be associated with certain metrics (such as the accrued revenue or the cost of disrupting the activities). The cost structure can be arbitrary. It can also be probabilistic in nature. A simple example of a revenue function is associating a revenue variable with a transaction. For example, if activity is an online broker/dealer process, a revenue can be $10 per each transaction that occurs as a part of this activity. An example of a cost could be "the enterprise incurs a cost of $1M if a particular web cluster is down for more than 24 hours". An example of a probabilistic cost function is "the enterprise incurs a cost of $1M if a particular web cluster is down for more than 24 hours, with probability 70% and $2M with probability 30%". The present invention is not limited to the nature of the revenue/cost structure.

Figure 4:
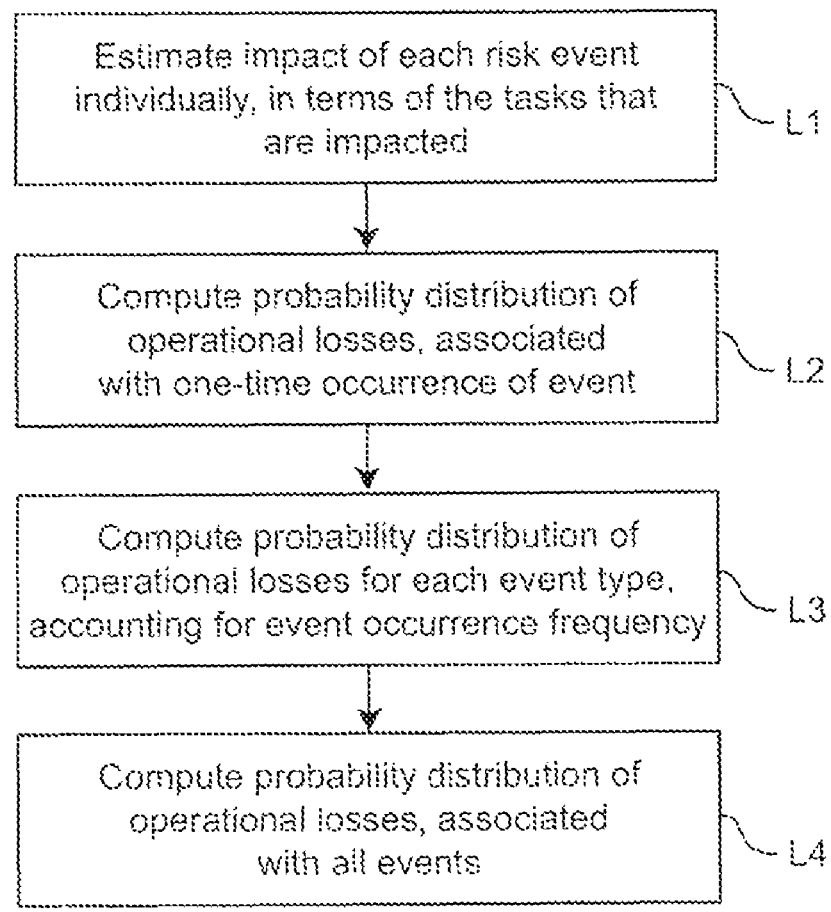
FIG. 4 is a flow diagram showing the sequence of steps involved in computing the probability distribution of losses resulting from operational risks in an enterprise.

The taxonomy of various adverse events, their associated frequency and duration functions, the topology linking adverse events to resources and activities and the revenue/cost function of activities constitute the stochastic network model of the operational risk associated with the given enterprise. The stochastic network model is then used for assessing the risk exposure of the operations of the underlying enterprise, presented in terms of probability distribution of the dollar amount of losses. This probability distribution function is computed using the following algorithm, outlined in FIG. 4.

Step L1—First, a risk exposure is identified for each adverse event individually as follows. The adversary event (say event A) is identified. The list of resources R(A) linked to the event A is identified by searching the underlying graph topology. Then the list of tasks T(A) linked to the resources in R(A) is identified by searching the underlying graph topology. Then the set of precedent constraints (directed links of the underlying topology) is used to identify the complete list T*(A) of the tasks affected by the event A. This list is precisely the list of tasks that are interrupted if the adverse event A occurs.

Step L2—The next step is to compute the probability distribution of the loss of revenues (cost) associated with a one time occurrence of the event A. This is done by combining the cost function of the activities T*(A) with the duration of the event A. For example if the duration of the event A is 12 hours with prob. 60% and 24 hours with prob. 40% and there are activities in T*(A) with revenues $100K per hour and $150K per hour, then the overall loss probability distribution is (100+150)×12=$3M with prob. 60% and (100+150)×24=$6M with prob. 40%.

Step L3—The computation in step L2 results in the probability distribution of the losses associated with one occurrence of the event A. To obtain the overall probability distribution of the losses over a fixed time period (for example a year) a convolution of the probability distribution of losses function obtained in step L2 is computed, with the number of terms in the convolution given by the frequency distribution of the event A. The convolution computation is a standard method of computing the distribution function of a sum of several random variables. It is well described in most of the books on probability theory (see, for example, S. Ross, Stochastic Processes, Wiley Publishers).

Step L4—Finally, the overall probability distribution of the losses is computed due to all types of adverse events A, B, C, etc. by computing the convolution function of the losses computed in step L3. The overall loss during the entire time period (for example a year) is obtained as the sum of the losses due to individual events. Therefore, the probability distribution of the sum is the convolution of individual probability distributions.

The computational effort for estimating the loss distribution is a polynomial function of the model input parameters. As a result, the computation of the loss distribution function can be performed efficiently using a computer implementation of our algorithm. The input to the model consists of the directed graph description (topology) including the dependency between the tasks and the probability distributions of input random variables including frequency and duration of adverse events and cost functions. Our invention is not limited to the specific details of the efficient method described above.

These steps are described formally below for our preferred embodiment. The essential elements of the operational risk model are:

Tasks, denoted henceforth as $T_1, T_2, \ldots, T_N$.

A collection of resources, denoted henceforth as $R=\{r_1, r_2, \ldots, r_3\}$, where $r_1$ are individual resources.

Events $E_1, E_2, \ldots, E_K$ which may cause failures. Each event $E_i$, $1 \leq i \leq K$ occurs $N_i$ times during a period of interest (say a year), where $N$, is distributed according to probability distribution $F_{N,i}(n)$, $n \in N$, independently for all i. Each time an event $E_i$ occurs, its duration is a random variable $D_i$ with the probability distribution $F_{D,i}(t)$, $t \geq 0$.

Unit time cost $C_1, C_2, \ldots, C_N$ associated with non-execution of tasks $T_1, T_2, \ldots, T_N$.

The elements of the model listed above are interdependent via the following graph-theoretic construction.

To each task $T_i$ we associate a list of required resources $R(T_i) \subset R$. This is a list of resources required to complete task $T_i$. It is also conceivable that there are alternative lists $R_i = \{R_i^1, \ldots, R_i^m\}$ either of which can satisfy the requirement of executing task $T_i$, but for now we assume the former.

To each event $E_i$ we associate a list of resources $R(E_i)$ affected by event $E_i$, meaning that if the event $E_i$ occurs, the resources in $R(E_i)$ are not available.

We associate precedents between the tasks. Certain tasks can only be completed if some other tasks are completed. We represent it as a directed graph with nodes given as tasks $T_i$ and directed edges $T_i \rightarrow T_j$ representing the fact that the task $T_j$ can only be completed if task $T_i$ is completed.

For each task $T_i$ we identify the list $P(T_i)$ of tasks which must be executed before $T_i$ is executed. This list is found from the directed graph. For convenience we assume that $P(T_i)$ includes $T_i$. Then for each event $E_i$ we identify the list of tasks $T(E_i)$ which cannot be executed if the event $E_i$ occurs. This list is found simply as $$T(E_i) = \{T_i : R(E_i) \cap \cup_{T_s \in P(T_i)} R(T_s) \neq \emptyset\}$$

which is the list of tasks whose resource requirements and/or whose precedents' resource requirements intersect with the set of resources "knockdown" by the event $E_i$. To each event $E_i$ we associate the "per unit time" cost $C(E_i)$ incurred if the event $E_i$ occurs and its duration is one unit of time. This cost is found as $$C(E_i) = \sum_{T_i \in T(E_i)} C_i.$$

Then the total cost incurred over a given horizon is found as $$C_{total} = \sum_{1 \leq i \leq N} C(E_i) \sum_{1 \leq j \leq N_i} D_j^i,$$

where the distributions of $N_i$ and $D_j^i$ are $F_{N,i}$ and $F_{D,i}$, respectively, and all of the involved random variables are independent. The expected loss is then $$E[C_{total}] = \sum_{1 \leq i \leq N} C(E_i) E[D_i] E[N_i].$$

The entire distribution of $C_{total}$ can be found by inverting a transform of the random variable $C_{total}$. Using independence this transform is $$g_{C_{total}}(s) = \prod_{1 \leq i \leq N} g_N(g_{D_i}(s)),$$

where $g_X$ is the transform of a random variable X.

Figure 5:
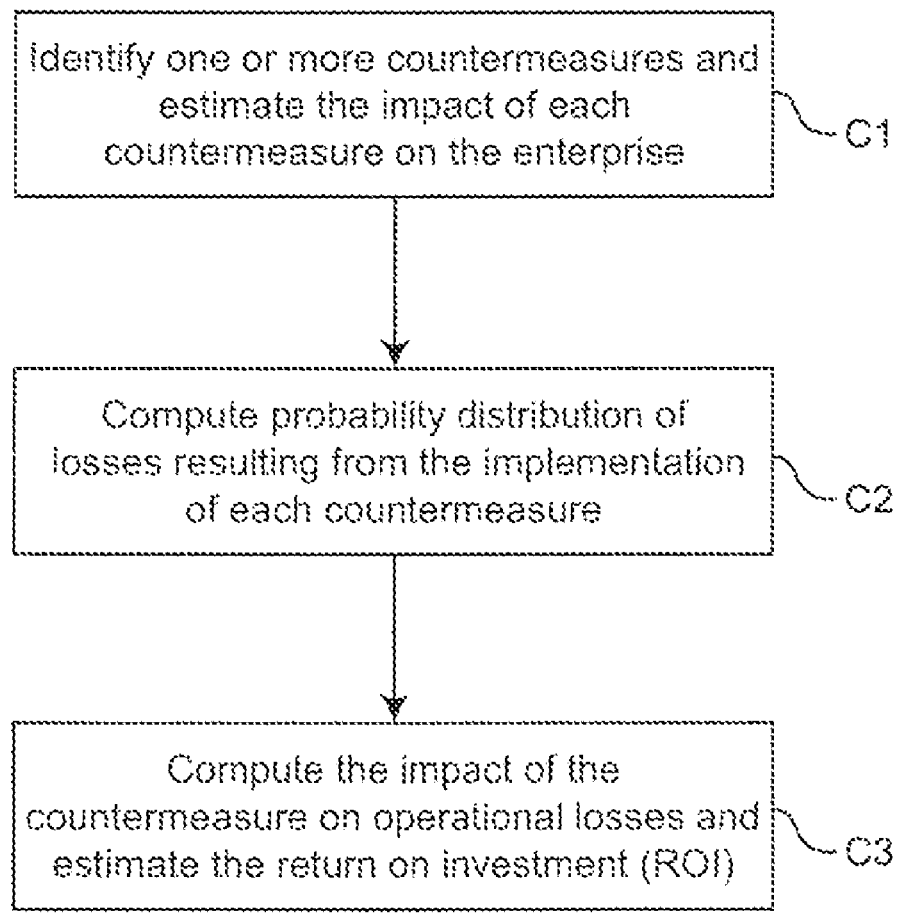
FIG. 5 is a flow diagram showing the sequence of steps involved in estimating the effectiveness of countermeasures to operational risks in an enterprise.

The steps L1-L4 result in overall estimation of the loss exposure of the enterprise with respect to the operational losses. Once this task is achieved the merits of various countermeasures can be estimated using the following steps, as described in FIG. 5.

Step C1—One or several countermeasures are identified. The impact of these countermeasures on the underlying enterprise is identified. The nature of the impact can be arbitrary. For example, a countermeasure can be an updated IT infrastructure as a result of which the recovery from a hacker attack is reduced by 70%. Or a countermeasure can result in a reduced frequency of adverse events. For example, as a result of an upgraded IT infrastructure the average frequency of down time of a web cluster goes from 7/year to 2/year.

Step C2—The probability distribution of the losses is computed under the assumption that the countermeasures identified in step C1 are taken. This is done by implementing steps L1-L4 above but applied to the modified model of the enterprise in which the countermeasure(s) are taken. The end result of this step is a new probability distribution function of the revenue losses.

Step C3—The results of step C2 are compared to the results of step L4 of the steps L1-L4 above for the "As Is" situation to estimate the quantitative merits of the countermeasure. The comparison can take various forms, an example of which is: the losses the enterprise X during 2004 will not exceed $1.5M with probability 95%. But if the countermeasures are taken, then the losses will not exceed $0.8M with probability 95%.

The computations described by steps L1-L4 and C1-C3 provide a comprehensive analysis of the Operational Risk exposure of the enterprise and relative merits of the possible one or multiple countermeasures directed at reducing the revenue losses. This can be thus used to estimate the Return on Investment (ROI) for specific countermeasures and prioritize the deployment of operational risk countermeasures.

The method described in this invention can also be utilized to diagnose key sources of operational risk in an enterprise. This is particularly important because the sources of risk are many-fold; what is of relevance, is the most important risks, because these deserve the attention of risk managers. For example, it is useful to identify the risks that cause losses beyond a specified threshold (say $ 200 million), with a specified level of confidence.

Let $C_1, \ldots, C_d$ be the potential losses due to adverse events of type $1, \ldots, d$, respectively. Given two random variables X, Y, we say X is "stochastically greater" than Y, if the cumulative distribution functions (CDF) of X, Y satisfies $F_X(t) \leq F_Y(t)$ for all t, ie. $P(X>t) \geq P(Y>t)$. Our model will give the probability distribution function of C, $i \in \{1, \ldots, d\}$; therefore, by comparing their CDFs we can obtain the stochastic order of $C_1, \ldots, C_d$ which also gives the order of significance of corresponding adverse events. Alternatively, we may determine the most significant events based on the tail probability of respective losses. For instance, for a given threshold of losses $\Theta$, we compare $P(C_i \geq \Theta)$, $i \in \{1, \ldots, d\}$ and the largest one corresponds to the leading adverse event.

Once the important risks are identified using this model, suitable countermeasures can then be deployed to control the risk. Thus, the modeling approach described in this invention can be used to determine the optimal strategy for operational risk mitigation. Suppose for each adverse event there is some countermeasure to can be taken at some cost to the organization. Let $\eta_1, \ldots, \eta_d$ be the proportion of total budget that is allocated to control adverse events $1, \ldots, d$, and $\eta_1 + \ldots + \eta_d = 1$. Let $C(\eta_1, \ldots, \eta_d)$ be the cost after countermeasure with allocation proportion $\eta_1, \ldots, \eta_d$. The problem reduces to:

$$\min_{\eta_i \geq 0, \eta_1 + \ldots + \eta_d = 1} g(C(\eta_1, \ldots, \eta_d))$$

where $g(\cdot)$ is an objective function determined by our criteria. For instance, we may take $g(\cdot)$ as the expectation $E[C(\eta_1, \ldots, \eta_d)]$. To obtain the distribution of $C(\eta_1, \ldots \eta_d)$, we need information on the effect of countermeasures on reducing the duration caused by respective adverse events.

Figure 6:
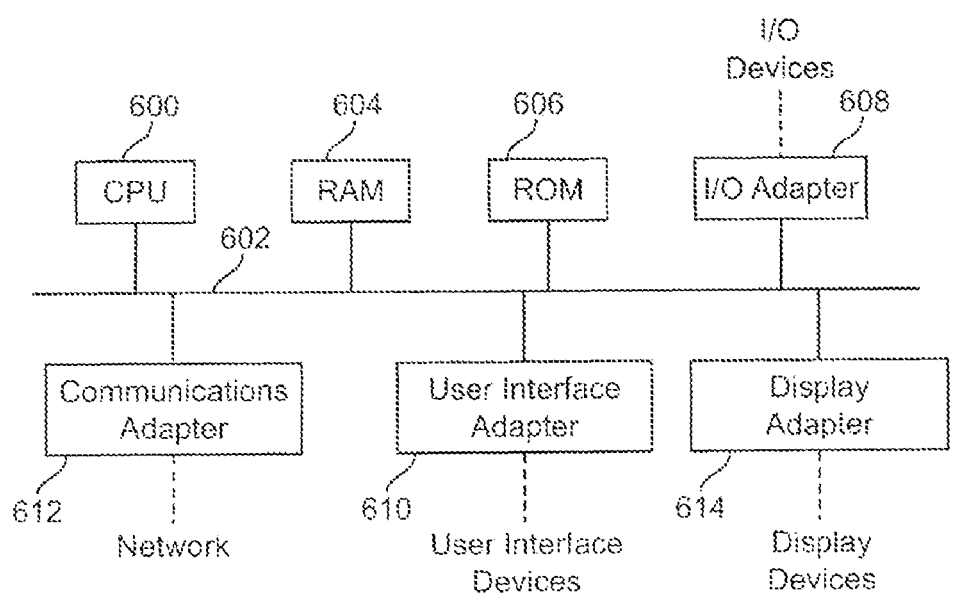
FIG. 6 is a block diagram of the environment and configuration of a computer system for implementing the present invention.

FIG. 6 shows a typical hardware configuration of a computer system in accordance with the invention that preferably has at least one Central Processing Unit (CPU) 600. The CPUs are interconnected via a system bus 602 to a random access memory (RAM) 604, read-only memory (ROM) 606, input/output adapter 608 (for connecting peripheral devices such as disk units and tape drives to the bus), user interface adapter 610 (for connecting user devices such as keyboard, mouse, etc. to the bus), communication adapter 612 (for connecting the computer system to an information network such as Internet, Intranet, etc.) and a display adapter 614 (for connecting the bus to a display device)

In addition to the environment in FIG. 6, a key aspect of this invention includes a computer implemented method for operational risk assessment and mitigation. As an example, this method may be implemented in the particular hardware environment discussed above. The method may be implemented, for example, by operating a computer, as embodied by a digital data processing apparatus to execute a sequence of machine-readable instructions. These instructions may reside in various types of signal-bearing media such as a CD, a diskette, etc.

While the invention has been described in terms of a single preferred embodiment, those skilled in the art will recognize that the invention can be practiced with modification within the spirit and scope of the appended claims.

The invention claimed is:

1. A method for modeling and quantifying operational risk in a business enterprise comprising the steps of:
    identifying one or more operational risks in the business enterprise,
    obtaining historical information on events that contribute to identified operational risks,
    identifying one or more business processes in the business enterprise,
    associating identified business processes with underlying logical and physical infrastructure and operational risks,
    constructing by a computer a probabilistic network model based on the business processes, underlying infrastructure and operational risks, said network comprising a taxonomy of the operational risks, each operational risk having associated functions for frequency of occurrence over a time period and duration, a topology linking each operational risk to one or more corresponding resources disrupted and consequent one or more activities disrupted, and functions for each activity identifying revenue from the activity and cost from disruption of the activity, and
    computing by the computer an overall potential exposure to losses in the business enterprise from the identified operational risks over said time period,
    wherein the computation of the potential loss exposure due to an operational risk is itself inherently inclusive of a combinatorial risk explosion; and wherein the computational method obviates the combinatorial risk explosion by constructing a filtering operation determined by setting the parameters of the input operational risks to specified material risk levels according to the tolerances of a particular institution or a class of institutions.

2. A method according to claim 1, wherein the model is used to quantify any combination of technology, process and/or people risk, or the risk of any of them separately.

3. A method according to claim 1, wherein probability distribution of financial losses is calculated using an algorithm whose computational effort is a non-exponential function of number of operational risks and parameters describing the probabilistic network.

4. A method according to claim 1, further comprising the step of taking one or more actions or countermeasures to control one or more aspects of operational risk.

5. A method according to claim 1, further comprising the step of taking one or more actions or countermeasures to control the financial risk presented by a system.

6. A method according to claim 1, further comprising the step of estimating a Return on Investment (ROI) for identified risk countermeasures.

7. A method according to claim 1, further comprising the step of modeling the state of an environment according to the risk tolerance of a manager or owner of the business enterprise.

8. A method according to claim 1, wherein users can dynamically alter the state representation of an environment to create "what-if" scenarios.

9. A method according to claim 1, wherein the at least one operational risk event further comprises the step of prioritizing events reflecting state changes based on changes in systemic quantified risk and 4 optimize the allocation of resources to manage system change.

10. A method according to claim 1, wherein the assessed risk is the determination of the probability of failure of any system component, as well as its duration and frequency.

11. A computer implemented method for modeling and quantifying operational risk of a business enterprise comprising the steps of:

identifying one or more operational risks in the business enterprise, obtaining historical information on events that contribute to the identified operational risks, identifying one or more business processes in the business enterprise, associating the identified business processes with underlying logical and physical infrastructure and operational risks, constructing by a computer a probabilistic network model based on the business processes, underlying infrastructure and operational risks, said network comprising a taxonomy of the operational risks, each operational risk having associated functions for frequency of occurrence over a time period and duration, a topology linking each operational risk to one or more corresponding resources disrupted and consequent one or more activities disrupted, and functions for each activity identifying revenue from the activity and cost from disruption of the activity, and computing by the computer an overall potential exposure to losses in the business enterprise from the identified operational risks over said time period, wherein the computation of the potential loss exposure due to an operational risk is itself inherently inclusive of a combinatorial risk explosion; and wherein the computational method obviates the combinatorial risk explosion by constructing a filtering operation determined by setting the parameters of the input operational risks to specified material risk levels according to the tolerances of a particular institution or a class of institutions.

12. A non-transitory, signal-bearing medium tangibly embodying a program of machine readable instructions executable by a digital processing apparatus to perform a method for modeling and quantifying operational risk of a business enterprise comprising the steps of:

identifying one or more operational risks in the business enterprise, obtaining historical information on events that contribute to identified operational risks, identifying one or more business processes in the business enterprise, associating identified business processes with underlying logical and physical infrastructure and operational risks, constructing a probabilistic network model based on the business processes, underlying infrastructure and operational risks, said network comprising a taxonomy of the operational risks, each operational risk having associated functions for frequency of occurrence over a time period and duration, a topology linking each operational risk to one or more corresponding resources disrupted and consequent one or more activities disrupted, and functions for each activity identifying revenue from the activity and cost from disruption of the activity, and computing an overall potential exposure to losses in the business enterprise from the identified operational risks over said time period, wherein the computation of the potential loss exposure due to an operational risk is itself inherently inclusive of a combinatorial risk explosion; and wherein the computational method obviates the combinatorial risk explosion by constructing a filtering operation determined by setting the parameters of the input operational risks to specified material risk levels according to the tolerances of a particular institution or a class of institutions.

* * * * *